UNITED STATES PATENT OFFICE.

DANIEL CAMERON AND DAVIS S. CARRAWAY, OF OMAHA, NEBRASKA, ASSIGNORS TO THE CUDAHY PACKING COMPANY, OF CHICAGO, ILLINOIS.

PROCESS OF RECOVERING GLYCERIN FROM TANK-WATER.

SPECIFICATION forming part of Letters Patent No. 602,725, dated April 19, 1898.

Application filed February 28, 1898. Serial No. 671,988. (No specimens.)

*To all whom it may concern:*

Be it known that we, DANIEL CAMERON and DAVIS S. CARRAWAY, citizens of the United States, residing at Omaha, in the county of Douglas and State of Nebraska, have invented a certain new and Improved Method of Recovering Glycerin from Tank-Waters, of which the following is a specification.

Our invention relates to the utilization of the waste products of slaughter-houses, packing-houses, and other rendering establishments, and has to do particularly with the treatment of tank-water for the recovery therefrom of glycerin.

As is well known to those familiar with the subject, tank-water is produced as a by-product in rendering establishments by the cooking under pressure of the scraps of meat, bone, sinews, lungs, intestines, and other nitrogenous matter containing more or less fat, such cooking being continued for several hours until the substances in the tank are decomposed to a great extent and the fat liberated. A large part of the nitrogenous matter remains in solution in the water derived from the solids introduced into the tank and from the condensed steam, the fats rising to the surface, while the undissolved matter to a great extent settles to the bottom of the tank. The liquid between the fat and the solids or "tankage" in the bottom of the tank is known as "tank-water," and after the fat has been skimmed off is drawn off from the tankage and disposed of in various ways. This tank-water (which consists of an aqueous solution of such portions of the nitrogenous and other constituents of the animal matter thrown into the tanks as are originally soluble or are decomposed into soluble substances by the long-continued boiling at a high temperature to which they are subjected in the tanks, together with certain undissolved nitrogenous substances which are carried in suspension) was for many years largely discharged into the sewers, although it was known to contain valuable nitrogenous matter, and even at the present day it is so disposed of in almost all houses of small capacity, as it has been found impracticable to utilize it economically, except in houses producing large quantities of it daily. In some establishments of sufficient capacity to justify the treatment of the tank-water it is used in the manufacture of a fertilizer, the nitrogenous matter being treated with certain chemicals to overcome the deliquescent properties developed when untreated tank-water is evaporated to dryness. As above suggested, however, the expense of such treatment is so great, comparatively, as to limit its application to the larger houses. So far as we are aware no other use has been made of tank-water, although it has been produced for upward of thirty years, and it is to a great extent a waste product at the present day. We have discovered, however, that in addition to the nitrogenous matter hitherto supposed to be its most valuable, if not its only valuable, constituent tank-water contains a much more valuable substance—viz., glycerin—in such quantity as to make its recovery important; and we have also discovered a process of treatment by which the glycerin may be economically recovered, thereby making the tank-water of considerable value and enabling even the smaller establishments to utilize it at a profit.

In a broad or general sense our process consists in treating the tank-water to effect a coagulation or separation of the nitrogenous matters from the glycerin-bearing liquid which holds them in solution and in then removing the coagulated matter from such liquid and expelling more or less of the contained water, leaving an impure glycerin. The removed nitrogenous matter may be further treated in any well-known manner for use as a commercial fertilizer, as by drying alone or after further manipulation.

Our invention, in addition to the general method of treatment above described, includes, as a further step, the subsequent treatment of the impure glycerin for the removal of the peptones, potash-salts, soluble phosphates, and other impurities, as will be specifically hereinafter described; but the principal feature of the invention is the separation and removal of the contained nitrogenous matter from tank-water, by which the glycerin-containing liquor is rendered susceptible of further treatment for purposes of purification.

In practice our invention may be applied in various ways and by the use of various reagents, but the specific treatment hereinafter described we have found to produce the most satisfactory results.

To the tank-water as it comes from the tank slaked lime is added in about the proportion of three hundred pounds of lime to four thousand gallons of tank-water. The mixture is then boiled, preferably at atmospheric pressure, for about one hour. The boiling with lime serves not only to coagulate or precipitate the greater part of the nitrogenous or albuminous matter, but acts also to saponify such undecomposed fats as may be present, thereby liberating the glycerin therein contained. About four hundred pounds of green copperas, preferably in solution in water, are then added, resulting in the formation of a copious precipitate of ferrous hydrate by the reaction of a part of the copperas upon the calcium hydrate. This iron precipitate, owing to its flocculent character, carries down with it mechanically practically all, or at least a large proportion, of the suspended matter contained in the tank-water. The surplus iron sulfate reacts upon the albuminous or nitrogenous matter in solution in the tank-water, and as the resulting compounds are practically insoluble in the supernatant liquid they are precipitated with the other insoluble matter. The chemical compounds thus formed are principally salts of iron and ammonium, the ammonium being derived from the nitrogenous matter, which by this means is rendered non-deliquescent and susceptible of being dried for use as a commercial fertilizer without material loss of nitrogen.

To decompose such organic matter as remains in solution in the supernatant liquid after the treatment above described and effect its precipitation, so that it can be removed by subsequent filtration, as well as to precipitate as calcium sulfate any excess of calcium hydrate that may remain in solution, the solution is then neutralized with sulfuric acid and filtered, the nitrogenous matter being retained in the filter, while the glycerin with potash and other soluble salts remain in the filtrate, which is an impure dilute solution of glycerin. The neutralization of the solution before the separation of the precipitated matter prevents the liquid from injuriously affecting the filter-press and cloths. The purification and concentration of this liquid are secured by further treatment, as follows: About three hundred pounds, more or less, of slaked lime are added to the filtrate, which is then allowed to stand until the precipitate formed settles to the bottom. The supernatant liquid is then decanted and treated with sulfuric acid and aluminium sulfate to neutralization, the proper proportion of acid to accomplish the neutralization being first determined by titrating a sample of the liquor with normal acid, after which the amount necessary to neutralize the whole of the liquor is computed, and for one-fifth of it its chemical equivalent in sulfate of aluminium is substituted. Ordinary sulfate of aluminium is preferably used, but any suitable alum may be used. The liquor is then filtered again and the filtrate evaporated *in vacuo* to a specific gravity of about 34° Baumé. The quantity of lime added to the filtrate, as above described, depends largely upon the quantity of organic matter remaining in the liquor, its function being to coagulate and precipitate as much as possible of the nitrogenous matter not separated by the previous treatment. It also serves to impart sufficient alkalinity to the liquor to permit a considerable quantity of acid and aluminium sulfate to be added thereto for the purpose of effecting further precipitation without producing an acid reaction. It is therefore desirable to add a considerable excess of the lime, thus avoiding the necessity of adding more later in the process to overcome any acidity imparted to the liquor by the acid and aluminium sulfate. The crude glycerin thus produced is susceptible of further purification by treatment in any of the well-known ways, and as crude glycerin is itself a valuable article of commerce and as the methods used in its purification are well known to manufacturing chemists we do not consider it necessary to describe them.

While we regard the above-described method of treatment as the most efficient, it should be understood that it may be varied by the substitution for the reagents mentioned of equivalent chemicals. For example, instead of slaked lime we may use chemically-equivalent proportions of sodium and potassium hydrate or other alkaline salts, and aluminium sulfate and certain other soluble metallic salts—such as persulfate and subsulfate of iron and alum—may be substituted for the copperas, and instead of sulfuric acid hydrochloric or certain other inorganic acids may be employed. If a soluble alkali be used instead of lime, as above suggested, the clear solution of glycerin ready for the evaporating-pans will contain sulfate of the alkali, if sulfuric acid be used, which will crystallize out during evaporation and may then be removed in the usual way. Furthermore, the proportions of chemicals given may be varied, as may be found expedient, owing to variation in the character of the tank-water under treatment, and in like manner the time and temperature of the boiling may be varied, provided it is so conducted as to effect the separation of the nitrogenous matter from the tank-water.

By our process of treatment, as will appear from the above description, we not only preserve all the valuable fertilizing material, but we produce another valuable article of commerce which has hitherto been entirely lost, the additional profit thus derived making it practicable for even small establishments to treat tank-water with profit.

What we claim is—

1. The method of recovering glycerin from tank-waters which consists in separating and removing from the tank-water substantially all the nitrogenous matter contained therein, and removing from the residuary liquid the excess of moisture, substantially as described.

2. The method of recovering glycerin from tank-waters which consists in coagulating and removing substantially all of the nitrogenous matter contained therein, and evaporating the residuary liquid, substantially as described.

3. The method of recovering glycerin from tank-waters which consists in separating and removing from the tank-water substantially all the nitrogenous matter contained therein, and purifying and evaporating the residuary liquid, substantially as described.

4. The method of recovering glycerin from tank-waters which consists in boiling the tank-water with a suitable alkali, adding a suitable metallic salt, and neutralizing and separating the precipitated or coagulated matter from the supernatant liquid, substantially as described.

5. The method of recovering glycerin from tank-waters which consists in boiling the tank-water with a suitable alkali, adding a suitable metallic salt, neutralizing and separating the precipitated or coagulated matter from the supernatant liquid, treating the supernatant liquid with an alkali, separating the supernatant liquid from the precipitate, adding a suitable metallic salt, and neutralizing the solution, substantially as described.

6. The method of recovering glycerin from tank-waters which consists in boiling the tank-water with a suitable alkali, adding a suitable metallic salt, neutralizing and separating the precipitated or coagulated matter from the supernatant liquid, treating the supernatant liquid with an alkali, separating the supertanant liquid from the precipitate, adding a suitable metallic salt, neutralizing the solution, removing the last precipitate, and evaporating the supernatant liquid *in vacuo* to about 34° Baumé, substantially as described.

7. The method of treating tank-waters to render insoluble the nitrogenous matter therein contained, which consists in heating the tank-waters with a suitable alkali, and adding a suitable metallic salt, substantially as described.

8. The method of treating tank-waters to render insoluble the nitrogenous matter therein contained, which consists in heating the tank-waters with a suitable alkali and then adding sulfate of iron or its equivalent, substantially as described.

9. The method of treating tank-waters to render insoluble the nitrogenous matter therein contained, which consists in boiling the tank-waters in the presence of lime and then adding sulfate of iron or its equivalent, substantially as described.

DANIEL CAMERON.
DAVIS S. CARRAWAY.

Witnesses:
H. L. KREIDER,
E. A. CUDAHY.